(12) United States Patent
Wolf

(10) Patent No.: US 11,485,662 B2
(45) Date of Patent: Nov. 1, 2022

(54) INTEGRATED FILTRATION AND GAS FLOATATION WATER TREATMENT SYSTEM AND PROCESS

(71) Applicant: GEMINI SCIENCE, LLC, San Marcos, TX (US)

(72) Inventor: Wayne Wolf, Dallas, TX (US)

(73) Assignee: GEMINI SCIENCE, LLC, Dallas, TX (US)

( * ) Notice: Subject to any disclaimer, the term of this patent is extended or adjusted under 35 U.S.C. 154(b) by 800 days.

(21) Appl. No.: 16/255,335

(22) Filed: Jan. 23, 2019

(65) Prior Publication Data

US 2019/0225522 A1   Jul. 25, 2019

Related U.S. Application Data

(60) Provisional application No. 62/621,560, filed on Jan. 24, 2018.

(51) Int. Cl.

| | |
|---|---|
| C02F 9/02 | (2006.01) |
| C02F 9/00 | (2006.01) |
| C02F 1/24 | (2006.01) |
| C02F 1/78 | (2006.01) |
| C02F 103/10 | (2006.01) |
| C02F 1/00 | (2006.01) |
| C02F 1/44 | (2006.01) |
| C02F 103/00 | (2006.01) |
| C02F 1/76 | (2006.01) |

(52) U.S. Cl.
CPC ............. *C02F 9/005* (2013.01); *C02F 1/004* (2013.01); *C02F 1/24* (2013.01); *C02F 1/44* (2013.01); *C02F 1/76* (2013.01); *C02F 1/78* (2013.01); *C02F 2103/001* (2013.01); *C02F 2103/10* (2013.01); *C02F 2201/001* (2013.01); *C02F 2201/008* (2013.01); *C02F 2301/08* (2013.01); *C02F 2303/16* (2013.01)

(58) Field of Classification Search
CPC ................ C02F 9/005; C02F 2201/008; C02F 2201/001; C02F 1/24; C02F 1/78; C02F 2103/10; C02F 1/004; C02F 1/44; C02F 2301/08; C02F 2303/16; C02F 2103/001; C02F 1/76
USPC ................... 210/221.1–221.2, 201, 703–707
See application file for complete search history.

(56) References Cited

U.S. PATENT DOCUMENTS 4,966,698 A * 10/1990 Hensley ............... B01D 36/001
  210/269
2018/0111848 A1 * 4/2018 Groen ....................... C02F 1/24

FOREIGN PATENT DOCUMENTS

EP          485355 A1 *  5/1992
JP          49-076337 A  *  7/1974

* cited by examiner

*Primary Examiner* — Thomas M Lithgow
(74) *Attorney, Agent, or Firm* — Brian K. Yost; Decker Jones, PC

(57) ABSTRACT

A compact, portable system and process separates dissolved and suspended solids from water containing high levels of those solids. Gas flotation is used with and oxidant as an initial stage. The resulting foam is dewatered in a fluid conveyance, with the gas being recycled to the flotation column, the foam sent to a holding tank and the water passed through one of a number of filtration vessels having granular filter media. As at least one filtration vessel is kept in operation filtering, another filtration vessel can be backwashed when the flow therethrough is diminished of the fluid level inside rises. Treated water is used for backwashing and provided to a collection conduit.

16 Claims, 3 Drawing Sheets

INTEGRATED FILTRATION AND GAS FLOATATION WATER TREATMENT SYSTEM AND PROCESS

BACKGROUND

Field of the Invention

The present invention relates to water purification by removal of contaminants by providing an oxidant, induction and/or dissolution of gas into fluid, quiescent detention of the water, and filtration of the water through a media or membrane.

Description of the Related Art

The treatment of contaminated water from industrial sources, or surface soil runoff, involves a series of processing steps for maximizing water purification and minimizing associated cost. Effluents from surface soil runoff and industrial processes including construction sites and oil and gas production operations, contain a relatively high concentration of a broad spectrum of contaminants and consequently, such water is more difficult to decontaminate than other water such as municipal waste water where permanently dedicated facilities for treatment of these waters consumes considerable land area. However, the nature of many contaminated water sources, such as construction sites and oil and gas production, are relatively temporary by comparison and have less stringent purification requirements that don't support the land and cost expenditures required by a "brick and mortar" approach.

High levels of suspended solids in water overwhelm filtrations systems that then require frequent backwashes for the filter. Such backwashes divert significant portions of the process throughput to waste. This results in a low overall through-put efficiency of the filtration system.

Solids in water in their soluble form cannot be removed from that water by means of simple filtration. Some of these soluble solids such as Fe and Mn can be converted to an insoluble form by oxidation. An oxidant that is effective for converting these metals to insoluble species is ozone.

The prior art of water filtration equipment is designed for a low range of suspended solids concentration and particle characteristics of contaminant. Generally for example, granular media and membrane filtration systems are efficient only when the portion of suspended solid contaminant mass in the water is less than 0.005% by weight; otherwise filter systems consume excessive amounts of their product volume to backwash. As used herein, "heavily solids-loaded water" is water that contains suspended solid contaminants of greater than 0.005% by weight.

Dissolved Gas Flotation (DGF) systems use a relatively large amount of physical area in order to provide the required fluid detention time to allow complete separation of suspended gas and solids from the process fluid stream.

Current temporary and mobile treatment installations capable of processing these high content fluids are an interconnected set of single purpose platforms which in total are impracticably large and complex to operate.

It is an object of this invention is to provide an efficient filtration system and process for heavily solids-loaded water.

It is a further object of this invention to provide a compact, portable device and process for filtration of heavily solids-loaded water.

It is a further object of this invention to extend the interval between filter backwashes of a water filtration system processing heavily solids-loaded water by integrating gas flotation above the filter.

It is a further object of this invention to minimize the water lost to waste from the use of gas flotation integrated into a compact filtration system.

It is a further object of this invention to de-water dissolved gas contactor foam and recover the liquid back into the process.

It is a further object of this invention to configure an integrated gas flotation and filtration system and, process to operate continuously while backwashing any one of a multiple of filtration cells as required.

SUMMARY

A heavily solids-loaded waste water treatment system comprises a flotation column having an inlet for the heavily solids-loaded waste water and an oxidant, the column having an upper end, the upper end having space for foam that is formed from the oxidant and the water. A fluid conveyance communicates with the upper end of the flotation column so that the foam from the flotation column flows into the fluid conveyance, the fluid conveyance providing a flow path for the foam of a predetermined length to dewater the foam. Plural filtration vessels are provided, with each filtration vessel having a vessel inlet and a vessel outlet, with filtration media inside the respective filtration vessel between the respective vessel inlet and the respective vessel outlet, the respective vessel inlet communicating with the fluid conveyance.

In one aspect, the oxidant is provided to the flotation column by dissolution and eduction.

In still another aspect, a common headspace communicates with the fluid conveyance, the common headspace collecting waste gas from the foam, a conduit allowing the waste gas to flow to the flotation column by eduction.

In still another aspect, a distributor is located in the fluid conveyance, which distributor flows water in the fluid conveyance proportionately into the respective filtration vessels.

In still another aspect, the flotation column is a first flotation column, further comprising a second flotation column in series with the first, flotation column, the second flotation column having a second inlet for oxidant.

In still another aspect, a one-way valve at the inlet of each filtration vessel regulates the flow of fluid from the fluid conveyance into the respective filtration vessel.

In still another aspect, wherein each of the one-way valves move in a vertical orientation, the flow rate of water through each of the filtration vessels is measured by the elevation of the one-way valve.

In still another aspect, wherein the flow rate of water through each of the filtration vessels is measured at the respective outlet.

In still another aspect, further comprising a pump associated with the outlets of the filtration vessels, which pump provides the motive force of the fluid through the respective filtration media.

In still another aspect, further comprising a backwash collection conduit, the backwash collection conduit communicating with each filtration vessel by a drain conduit, the drain conduit having an outlet that is above the top of a fluid volume in the backwash collection conduit so as to provide an air gap.

A process of treating heavily solids-loaded waste water, comprises the steps of providing oxidant with the heavily solids-loaded waste water in a gas flotation column and creating foam at an upper end of the column. The foam is flowed into a fluid conveyance and retaining the foam in the fluid conveyance so as to dewater the foam. The dewatered foam is passed into a holding vessel. The water is distributed from the foam to plural filtration vessels through a respective one way valve for each filtration vessel.

In one aspect, a first one of the filtration vessels is backwashed with water taken from any one of the filtration vessels. The one-way valve for the first filtration vessel is allowed to close during backwashing of the first filtration vessel. The backwash water is flowed from the first filtration vessel into a backwash collection conduit.

In another aspect, each filtration vessel is monitored for filter capability. Determining when one of the filtration vessels has diminished filtering capability and backwashing the one filtration vessel.

In another aspect, wherein the step of flowing the backwash water from the first filtration vessel into a backwash collection conduit further comprises the steps of flowing the backwash water across and air gap into the backwash collection conduit and above the fluid conveyance.

In another aspect, wherein the step of providing oxidant with the heavily solids-loaded waste water in a gas flotation column further comprises the step of providing oxidant with the heavily solids-loaded waste water in a first gas flotation column. Water is flowed from the upper end of the first flotation column to a second flotation column. Oxidant is provided to the second flotation column.

In another aspect, gas from the foam in the fluid conveyance is captured and recycled to the flotation column.

DETAILED DESCRIPTION OF PREFERRED EMBODIMENT

This invention provides a system and process for the treatment of waste water for reuse, especially waste water that is heavily loaded with organic and inorganic solids. The present invention integrates gas flotation with barrier filtration into the same construction, sharing common features to maximize process efficiency and throughput for a small footprint. As a result, the system can be mounted on a mobile platform, such as a trailer or skid, and moved to a particular site, such as a construction site, or an oil chilling pad.

In general, the gas flotation partially treats and removes much of the solids from the waste water. The gas creates foam, which foam is then dewatered. The partially treated waste water from the foam then passes through barrier filtration, which removes more of the solids. By using gas flotation as an initial stage or step in the treatment of the waste water, the barrier filtration does not require excessive backwashing with treated water.

Because the gas used in the flotation process is an oxidant, and is effectively consumed during flotation, providing a subsequent sequential flotation step with additional oxidant removes further contaminants from the waste water.

Figure 1:
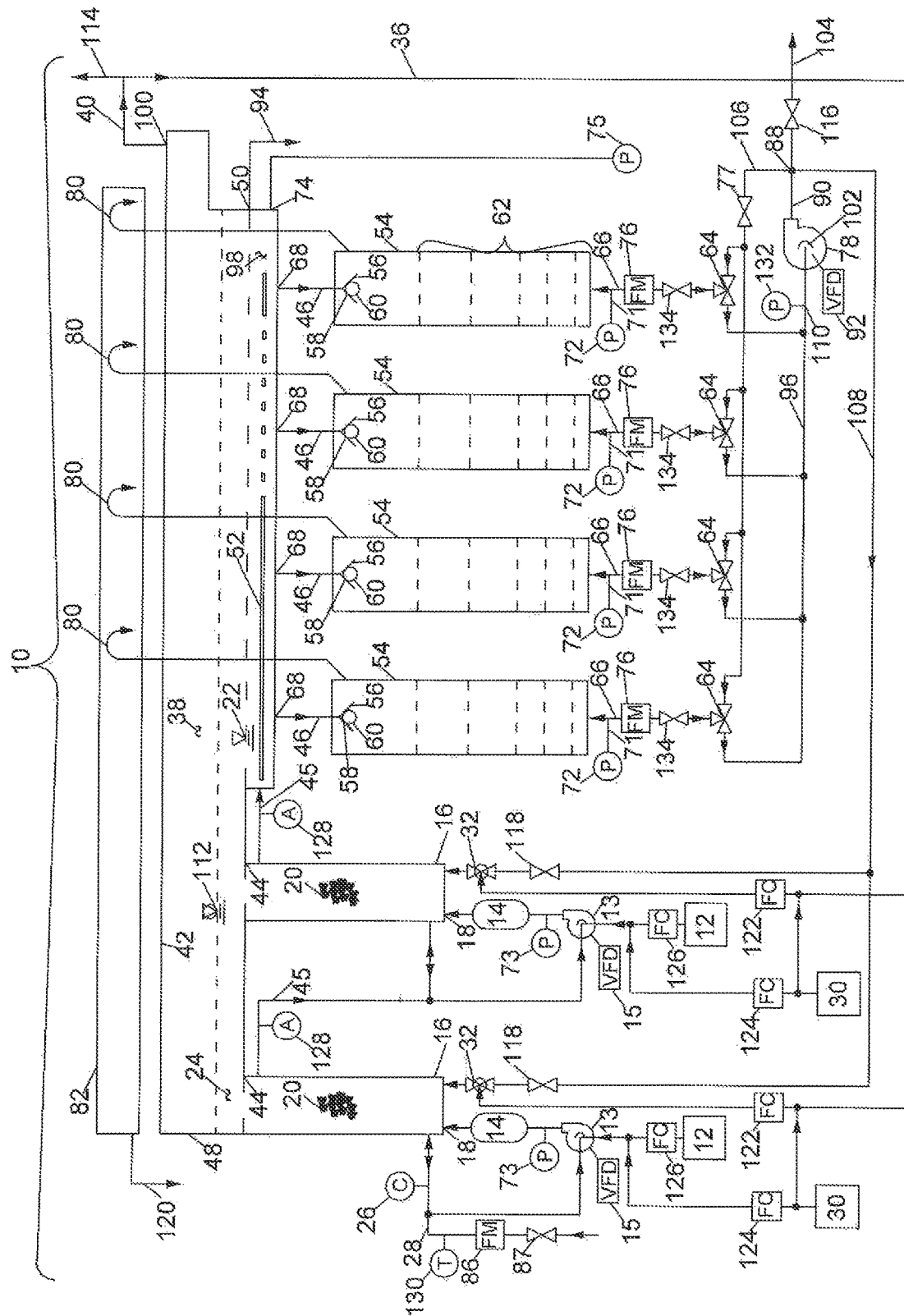
FIG. 1 is a diagram indicating the sequence and relationship of the process elements integrated into the system of the invention.

The system will be described first with reference to FIGS. 1 and 2, followed by a description of the process. In the description, like reference numbers indicate like components.

The treatment system 10 provides one or more gas flotation columns 16. The waste water is provided via an input line 28 to a pump 13. The pump 13 is a conventional and commercially available dissolved gas flotation type pump, which allows the introduction of gas into a liquid. Gas is provided from one or more gas sources 12, 30. The gas is provided to the pump 13, which is of the type suitable for mixing liquids and gases. A pressurized mixing chamber 14 or accumulator is provided downstream of the pump. The output of the pressurized mixing chamber 14 is connected to the gas flotation column 16 by way of a flow restriction device 18. The pressurized waste water and gas are provided at or near the bottom of the gas flotation column 16. As an alternative, the pump can be operated continuously even when the liquid level of the gas flotation column 16 is full or at a high level. A line is provided from near the bottom of the column back to the pump inlet.

The gas flotation column 16 provides a vertical space that allows the fluid mixture of liquid and gas to rise vertically. The height of the column is selected so as to provide a desired residence time of the liquid and gas. At the top of the column, the liquid and gas form a foam layer 24. The upper end of the gas flotation column 16 communicates with a hooded structure that forms a common headspace 48. The hooded structure closes the common headspace 48 off from the external atmosphere. The foam layer 24 is located in the common headspace 48.

In the embodiment shown, plural gas floatation columns 16 are shown. The gas flotation columns 16 are connected in series, with the treated water from one column exiting through conduit 45. The conduit 45 connects to the bottom of another gas floatation column 16, pump 13, pressurized mixing chamber 14, and flow restriction device 18. Pump flow into the gas flotation columns 16 is maintained so that a common water level is maintained between the columns.

The foam layer 24 exits the individual gas flotation columns 16 and moves into a common headspace liquid containment 98, which is a pipe, trough, etc. Although FIG. 1 shows the foam layer 24 of the leftmost gas flotation column 16 passing over the top of the rightmost gas flotation column 16. FIG. 1 is schematic. The foam layers of each column can move directly into the common headspace liquid containment 98. As discussed below in more detail, the foam separates into gas and liquid. The liquid falls to the bottom of the common headspace liquid containment 98. FIGS. 1 and 2 show the liquid surface 22. The liquid, which is partially treated water, in the common headspace liquid containment 98 moves into a selected filtration cell 54.

In the preferred embodiment, plural filtration cells 54 are provided to allow for continuous filtering, while also allowing for backwashing operations. Each filtration cell 54 has filter media 62, such as silica sand, and or granular garnet, and or anthracite coal or hollow fiber membrane. The water passes through the filter media and exits as clean water from the filtration cell via conduit 66. The clean water is collected in a common collection conduit 96 and is then pumped into one of various streams. A first stream 104 sends the clean water to an end use of some sort, whether that is returning the water to a natural body, or use in an industrial process, or some other use. A second stream 106 uses the water for backwashing the filter media. A third stream 108 uses the water for educting gas into the gas floatation columns 16.

Figure 2:
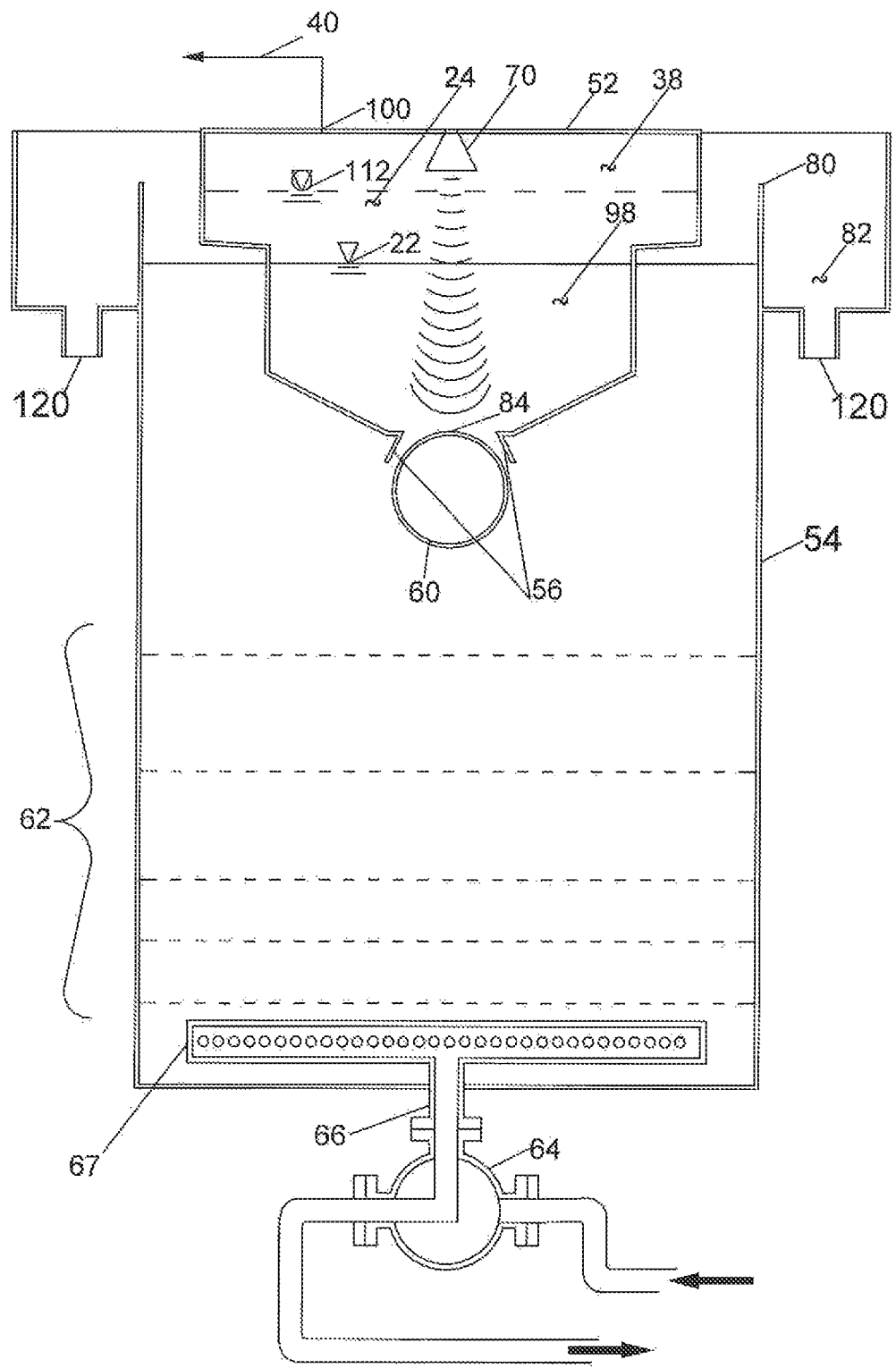
FIG. 2 is an elevational section view of a filter cell showing the common headspace and backwash overflow and backwash collection conduit.

FIG. 2 shows a filtration cell 54 in cross-section. The cell may be rectangular in cross-section, in order to allow efficient usage of space on a mobile platform, or as an alternative, the cell may be cylindrical. Filter media 62 is located in the lower portion of the cell. A collector/distributor 67 is located in the bottom of the cell. The collector/distributor 67 is a perforated pipe array. The distributor could be a single length of pipe, or it could be a two-dimensional array such as a cross shape or asterisk shape when viewed from above. The distributor is connected to conduit 66 that in turn is connected to a selection valve 64. The selection valve 64 selectively connects either the common collection conduit 96 for the clean water that exits the filtration cell 54, or the second stream 106 that provides clean water to the cell for backwashing the filter media 62.

At the upper end of the filtration cell 54, a one-way inlet valve 58 (shown in FIG. 2 with a valve float 60 and valve seat 56), is provided for admitting partially treated water into the cell. In the preferred embodiment, the valve is a ball float type valve.

Before describing the control system for the gas flotation columns 16 and backwashing the filtration cells 54, the process of cleaning water will be described. Generally, the first treatment step in the treatment process is a gas floatation process comprising blending mixed gases 12 into wastewater in the pressurized mixing chamber 14, that operates at a pressure several times that of the atmosphere, then releasing that mixed fluid through the flow restriction device 18 into the gas flotation column 16 at atmospheric pressure where the released gas creates small bubbles 20 in the wastewater. The mixed gas 12 may consist of any mix of any ratio including but not limited to the following: Oxygen, Carbon Dioxide, Nitrogen, and or Argon. Generally, the small bubbles 20 in the gas flotation column 16 rise to the liquid surface 22 of the gas flotation column 16 with a coating of solid particles attached. As the small bubbles 20 emerge at the liquid surface 22, these small bubbles 20 collapse forming the foam layer 24 consisting primarily of wet solids. A first port 26 for chemical injection is located at the process input line 28 for injection of water conditioning and or oxidant chemicals. The level of the liquid surface 22 is controlled by the position of inlet control valve 87. When an oxidant is added to the wastewater, that oxidant reacts with some of the dissolved solids in the wastewater producing the insoluble form of some of those solids which are then subject to being captured by the surface of the small bubbles 20 generated when the wastewater fluid is released from the pressurized mixing chamber 14. When the injected gas is a mixed gas 12, and at least one or more a the gases is an oxidant gas source 30 such as but not limited to Ozone, Chlorine, or Chlorine Dioxide, the oxidant is delivered into solution in the wastewater via the pressurized mixing chamber 14. In many instances the oxidant demand of the wastewater cannot be satisfied by the amount of oxidant that can be dissolved into the wastewater stream in the pressurized mixing chamber 14. In those instances, an eductor 32 can be connected to the gas flotation column 16 parallel to the pressurized mixing chamber 14 to mix additional, mass of oxidant containing gas into the wastewater. The third stream 108 of clean water is used for the eductor 32. In this invention, more than one gas mixing module consisting of pressurized mixing chamber 14, eductor 32, flow restriction device 18 and gas flotation column 16, can be configured in series such that the demand of the wastewater is sufficiently supplied.

In another embodiment of the invention, a portion or all of the waste gas from a contained volume 38 above the foam surface 112 above the gas flotation column 16 is returned into any eductor 32 of the serially configured gas mixing modules in the integrated process through waste gas reinjection line 36. Waste gas in the contained volume 38 is released from the system through the waste gas conduit 40, connected to a fifth port 100 in the system top cover 42 at a position located at the extreme distance in the system top cover 42 from the column upper end 44 of the nearest gas flotation column(s) 16. Any portion of the waste gas that is not reinjected through an eductor 32 is released from the system through waste gas discharge line 114.

In the common headspace 48, when the small bubbles 20 collapse and form the foam layer 24, some of the wastewater is trapped between the cells of foam; the proportion of the treatment wastewater flow that is trapped in the foam can be significant. With adequate time, the trapped wastewater will fall by force of gravity out of the foam, and when the foam is in immediate communication with the liquid surface 22, the liberated wastewater will return to the treatment wastewater flow.

Generally, the "in-process" wastewater is conveyed from the column(s) upper end 44 to the multiple filter cell inlet(s) 68 by means of the common headspace 48. The surface area, of the common headspace 48 is sized to provide adequate detention of the foam layer 24 to allow the trapped liquid to fall out of the foam layer 24 sufficiently while in direct communication with the liquid surface 22. The conveyance means of the wastewater from the column upper end 44 to the filter cell inlet(s) 68 is a continuous containment above and between the treatment elements of the gas flotation column 16 and the filtration cells 54 using all the available area inside a line that, generally spans between the outer most edges of bodies below.

This common headspace 48 containment encloses both the partially treated wastewater, void of gas bubbles, as well as a foam layer 24 above and in direct interface. As the foam layer 24 is carried along the direction of process flow (left to right using the orientation shown in FIG. 1), the amount of time since the foam layer 24 formed, increases. Once the foam layer has traveled past the filter cell inlet 68 of the last filtration cell 54 in the series of filtration cells, some portion of the foam layer 24 is continuously discharged over the common head space liquid containment upper edge 50 into a foam collection device 94 for removal from the process. This foam contains solid waste particles.

Along the fluid path inside the common headspace liquid enclosure, a plate baffle 52 of irregular shape is located inside the outer edges of the common headspace 48 containment, below the liquid surface 22 in a generally horizontal orientation to direct an even distribution of wastewater to each filter cell inlet 68. This prevents the first filter cell from receiving a disproportional amount of suspended solids and thus requiring more frequent backwashes. The partially treated wastewater is virtually void of the entrained gas bubbles that have been captured above the liquid surface 22 and with them most, but not all, of the suspended solid particles. The wastewater, along with the particles remaining in the partially treated wastewater, are drawn to the filter cell inlet 68 through inlet structure 46 of each of the filtration cells 54. Located in the opening of each filter cell inlet structure 46, a one-way inlet valve 58 (see FIG. 2) allows wastewater to flow in a filtration process progressive direction when that associated filtration cell 54 is in the mode of filtration, but prevents wastewater from flowing from the filtration cell 54 into the common headspace 48 when that associated filtration cell 54 is in the mode of backwashing. In a preferred embodiment, the one-way inlet valve 58 is a one-way valve in the form of a slightly buoyant float 60, sized to completely obstruct the opening between the common headspace 48 containment and the filter cell inlet structure 46 to the associated filtration cell 54 when at the upper limit of its floatation travel and against the valve seat 56 of its respective one-way inlet valve 58. The float 60 is limited in moving away from the inlet structure 46 by a cage (not shown). In yet another embodiment of the invention, an analog-type distance measuring device 70 is located centered, directly above each buoyant float 60 to monitor the elevation of the upper most surface 84 of its associated float 60 as a relative measure of the mass of fluid passing around the float 60 through the one-way inlet valve 58 between the common headspace 48 containment and the associated filtration cell 54.

Generally, when filtering wastewater through each of the filtration cell(s) 54 the flow of wastewater is down or across or a combination of both directions, through the filter media 62, further through the collector/distributor 67, constructed such that the filter media 62 is restrained from passing therethrough, the bi-directional conduit 66, past a second port 71 for measurement of water column height, to a flow path selection valve 64 and into a common collection conduit 96 common to the bi-directional conduit 66 and the flow path selection valve 64 of all of the filtration cell(s) 54. A third port 74 for measuring the water column height in the common headspace 48 by means of a water column height sensor 75, relative to the elevation of the bi-directional conduit 66 is located through a vertical edge member of the common headspace liquid containment 98. The distant end of the common collection conduit 96 is connected to the filtration pump inlet 102 of an filtration pump 78 where a fourth port 110 is located to measure the pressure inside the common collection conduit 96 by means of a water column height sensor 132. The filtration pump 78 is used to provide the motive force of the partially treated wastewater through all of the filtration cell(s) 54 while forcing the filtered wastewater further to divergence point 88 where, in selective portion, into one, two, or three streams: first stream 104, the system outlet through backpressure pressure control device 116 and second stream 106, to any filtration cell 54 requiring backwashing selected by means of flow path selection valve 64, and third stream 108, to one or all of the eductor(s) 32 attached to an associated standing gas flotation column 16 through an eductor drive valve 118. In one embodiment of the invention the filtration pump 78 is capable of operating with a negative inlet pressure relative to atmospheric pressure.

In another embodiment of the invention, associated to each filtration cell 54, located before the flow path selection valve 64, located after the bi-directional conduit 66, is an outlet flow control valve 134 that regulates the flowrate through each individual filtration cell 54. Above each flow control valve 134 below conduit 66 is a flow meter 76.

Generally, when any of the individual filtration cell(s) 54 are selected for backwash mode, the flow path selection valve 64 selects a flow path of reverse filtration process direction for that selected filtration cell 54 providing a portion of the treated product wastewater flow volume, diverted from the filtration pump discharge conduit 90, to the selected bi-directional conduit 66. The process regressive flow rate is such that the solid contaminants trapped in the filter media 62 are dislodged from the media in generally the opposite direction they lodged and carried along with the reverse filtration process flow to the backwash overflow device 80 which has an air gap between its outlet and the liquid level in a backwash collection conduit 82 for discharge from the process through a backwash water drain line 120. The backwash overflow device 80 is located at an elevation superior to the elevation of the filter one-way inlet valve 58 at of each filtration cell(s) 54. In another embodiment of the invention, the flow control valve 77 is located in the second stream 106 conduit after the divergence point 88 in the filtration pump discharge conduit 90 and before flow path selection valve 64 to regulate the flowrate of the backwash water supplied to any one of the filter cells in backwash mode.

Figure 3:
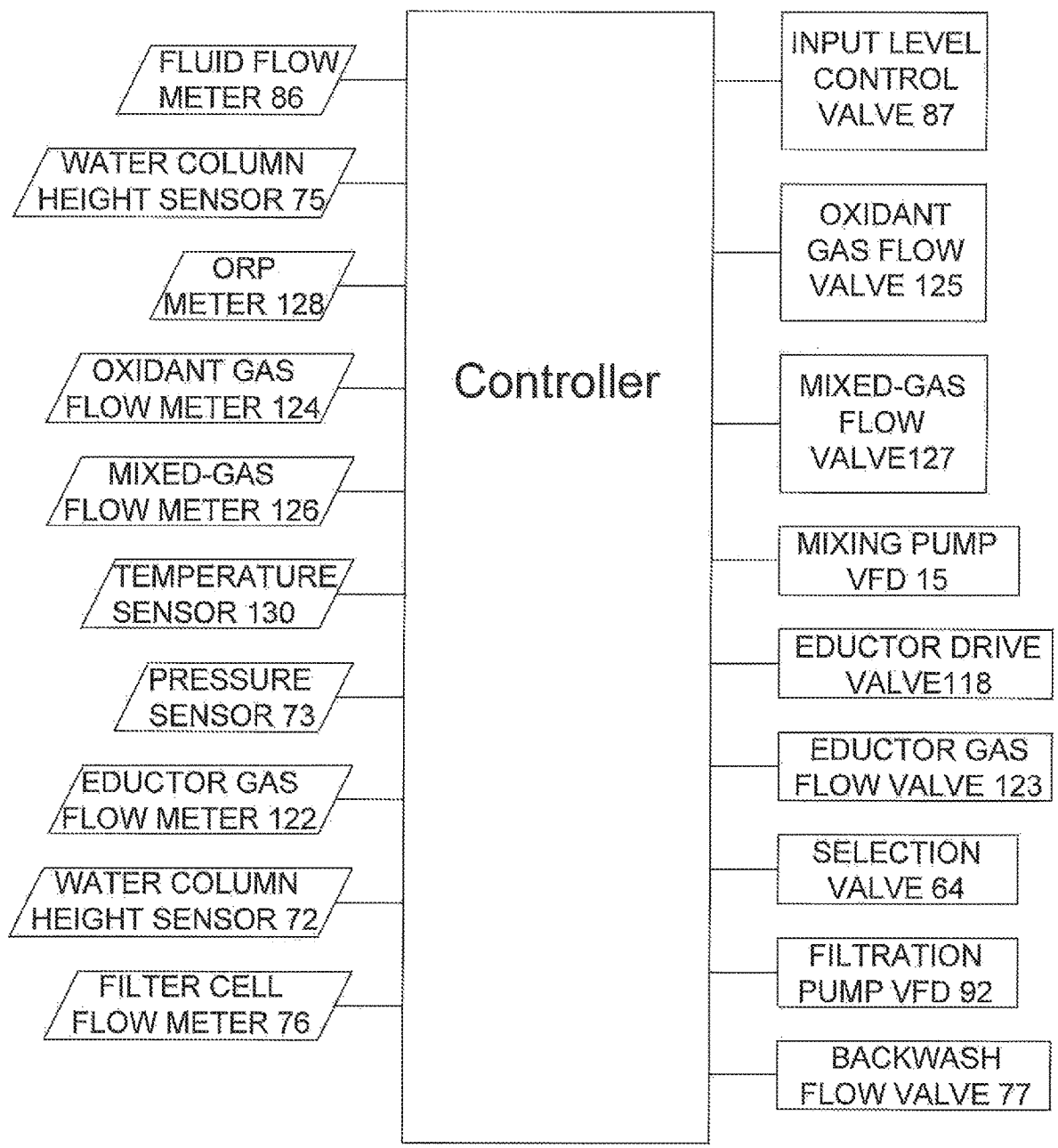
FIG. 3 is a block diagram of the control system.

The control system is shown in FIG. 3. The control system controls waste water input into the system, the gas injection volume into the gas flotation columns 16, monitors the flow of partially treated waste water into each filtration cell 54, and controls backwashing of each filtration cell 54.

The control system has inputs from a flow meter 86, and a water column height sensor 75, to control the liquid level in the system. The controller has an output to control an inlet control valve 87 to maintain a preset liquid surface 22. The water column height sensor and controller monitor the water level in the common headspace 48. If the liquid surface 22 is too low, as sensed by the water column height sensor 75, the controller opens the inlet control valve 87 to add waste water to the gas flotation column 16.

Each gas flotation column 16 has an ORP (Oxidation Reduction Potential) meter 128, a mixed-gas flow controller flow meter 126, an oxidant gas flow controller flow meter 124, a pressure sensor 73, and eductor gas flow controller flow meter, and an input water temperature sensor 130. These devices provide inputs into the controller. The controller has outputs to control the mixing pump 13, which is typically driven by a VFD (Variable Frequency Drive 15). The controller also controls a oxidant gas flow controller control valve 125, the eductor drive valve 118, the eductor gas flow controller control valve 123, and the mixed-gas flow controller control valve 127. The speed of the pump 13 is adjusted to maintain, the pressure measured by pressure sensor 73 within predetermined limits. The ORP meter 128 and controller monitor the oxygen reduction potential of the waste water and the controller adjusts the oxidant gas controller control valve 125 to maintain the ORP within predetermined limits. The controller also monitors the temperature and fluid and gas flows of the waste water to determine if the waste water is gas saturated. If the waste water is saturated, and the ORP level is below a preset level, the controller adjusts the educator gas controller control valve 123 to increase oxidant gas input. If the ORP of the, wastewater at the exit of a standing column is at the preset level and the waste water is under saturated, the controller adjusts the mixed-gas controller control valve 127 to increase gas input to the mixing pump.

If the controller determines the liquid surface 22 is at the preset level or has a high level, the controller starts the filtration pump 78 which is typically driven by a VFD (Variable Frequency Drive) 92 to Operate at a preset flowrate. The controller will decrement the filtration pump preset flowrate if the water pressure in common collection conduit 96, as measured by water column height sensor 72, falls below a preset level. In addition, one or more selection valves 64 are moved to the filtration mode, so that waste water flows down through the filter media in the respective filtration cell 54. Plural filtration cells 54 can be in the filter mode at any given time to increase filter throughput.

The controller has an input Water column height sensor 72, a filter cell flow meter 76 to control the backwash interval and sequence, of the series of filtration cells 54. In a first embodiment of the controller, the flow rate of each of the filtration cells 54 as measured, at flow meter 76 is maintained a level which is an equal share of the preset filtration pump operating rate. When the difference between water column levels above and below the filter media 62 of any filtration cell 54 is above a preset level, that filter cell is assigned to be backwashed.

In a second embodiment of the controller, the flow rate through each of filtration cells 54 is not regulated and the water column level below the filter surface of the filter media 62 of all of the online filter cells is very near the same. When the flowrate through any one of the filter cells in filtration mode falls a preset percent below the highest flowrate of any of the set of filtration cells 54 in filtration mode, that filter cell is assigned to be backwashed.

If more than one of the series of filtration cells 54 is assigned to be backwashed, the cell with the highest difference of the indicating parameter from the present backwash value, be it water column or flow rate, is given first priority. Only the first priority filtration cell 54 is backwashed.

When a first priority filtration cell 54 is backwashed, the respective flow path selection valve 64 is positioned to backwash position. The respective flow meter 76 and the controller monitor the flow rate and the accumulated volume of treated water that is driven upward, through the respective distributor/header through the filter media 62. In the first embodiment of the controller: if the backwash flow rate is less than or greater than the preset backwash flowrate, the controller adjusts the filter cell flow control valve to match the preset flowrate. In a second embodiment of the controller; if the backwash flow rate is less than or greater than the preset backwash flowrate, the controller adjusts the backwash rate flow control valve 77 to match the preset flowrate.

The backwash mode is complete when the accumulated backwash water volume meets a preset value. Once backwash mode is complete, the controller returns the respective filtration cell 54 to filtration triode and positions the respective selection valve 64 to filtration mode position.

The foregoing disclosure and showings made in the drawings are merely illustrative of the principles of this invention and are not to be interpreted in a limiting sense.

The invention claimed is:

1. A heavily solids-loaded waste water treatment system, comprising:
    a) A flotation column having an inlet for the heavily solids-loaded waste water and an oxidant, the column having an upper end, the upper end having space for foam that is formed from the oxidant and the water;
    b) A fluid conveyance that communicates with the upper end of the flotation column so that the foam from the flotation column flows into the fluid conveyance, the fluid conveyance providing a flow path for the foam of a predetermined length to dewater the foam;
    c) Plural filtration vessels, with each filtration vessel having a vessel inlet and a vessel outlet, with filtration media inside the respective filtration vessel between the respective vessel inlet and the respective vessel outlet, the respective vessel inlet communicating with the fluid conveyance
    d) a common headspace that communicates with the fluid conveyance; the common headspace being positioned above the flotation column and the plural filtration vessels such that the common headspace is adapted to house the foam from the flotation column and collect waste gas from the foam.

2. The heavily solids-loaded waste water treatment system of claim 1, wherein the oxidant is provided to the flotation column by dissolution and eduction.

3. The heavily solids-loaded waste water treatment system of claim 2, further comprising a conduit allowing the waste gas to flow to the flotation column by eduction.

4. The heavily solids-loaded waste water treatment system of claim 1 further comprising a distributor located in the fluid conveyance, which distributor flows water in the fluid conveyance proportionately into the respective filtration vessels.

5. The heavily solids-loaded waste water treatment system of claim 1 wherein the flotation column is a first flotation column, further comprising a second flotation column in series with the first flotation column, the second flotation column having a second inlet for oxidant.

6. The heavily solids-loaded waste water treatment system of claim 1 further comprising a one-way valve at the inlet of each filtration vessel to regulate the flow of fluid from the fluid conveyance into the respective filtration vessel.

7. The heavily solids-loaded waste water treatment system of claim 6 wherein each of the one-way valves move in a vertical orientation, the flow rate of water through each of the filtration vessels is measured by the elevation of the one-way valve.

8. The heavily solids-loaded waste water treatment system of claim 6 wherein the flow rate of water through each of the filtration vessels is measured at the respective outlet.

9. The heavily solids-loaded waste water treatment system of claim 1 further comprising a pump associated with the outlets of the filtration vessels, which pump provides the motive force of the fluid through the respective filtration media.

10. The heavily solids-loaded waste water treatment system of claim 1, further comprising a backwash collection conduit, the backwash collection conduit communicating with each filtration vessel by a drain conduit, the drain conduit having an outlet that is above the top of a fluid volume in the backwash collection conduit so as to provide an air gap.

11. A process of treating heavily solids-loaded waste water, comprising the steps of:
    a) Providing oxidant with the heavily solids-loaded waste water in a gas flotation column and creating foam at an upper end of the column;
    b) Flowing the foam into a fluid conveyance and retaining the foam in the fluid conveyance so as to dewater the foam, the fluid conveyance communicating with a common headspace, the common headspace being positioned above the flotation column and a plurality of filtration vessels and such that the common headspace is adapted to house the foam from the flotation column and collect waste gas from the foam;
    c) Passing the dewatered foam into a holding vessel;
    d) Distributing the water from the foam to the filtration vessels through a respective one way valve for each filtration vessel.

12. The process of treating heavily solids-loaded waste water of claim 11, further comprising the steps of:
    a) Backwashing a first one of the filtration vessels with water taken from any one of the filtration vessels;
    b) Allowing the one-way valve for the first filtration vessel to close during backwashing of the first filtration vessel;
    c) Flowing the backwash water from the first filtration vessel into a backwash collection conduit.

13. The process of treating heavily solids-loaded waste water of claim 12, further comprising the steps of:
    a) Monitoring each filtration vessel for filter capability;

b) Determining when one of the filtration vessels has diminished filtering capability and backwashing the one filtration vessel.

14. The process of treating heavily solids-loaded waste water of claim 12, wherein the step of flowing the backwash water from the first filtration vessel into a backwash collection conduit further comprises the steps of flowing the backwash water across an air gap into the backwash collection conduit and above the fluid conveyance.

15. The process of treating heavily solids-loaded waste water of claim 11, wherein:
   a) the step of providing oxidant with the heavily solids-loaded waste water in a gas flotation column further comprises the step of providing oxidant with the heavily solids-loaded waste water in a first gas flotation column;
   b) flowing water from the upper end of the first flotation column to a second flotation column;
   c) providing oxidant to the second flotation column.

16. The process of treating heavily solids-loaded waste water of claim 11, further comprising the steps of:
   a) Capturing gas from the foam in the fluid conveyance;
   b) Recycling the gas to the flotation column.

* * * * *